United States Patent
Fang et al.

(10) Patent No.: US 12,314,863 B1
(45) Date of Patent: May 27, 2025

(54) DETERMINING QUANTIZATION SCALE FACTORS FOR LAYERS OF A MACHINE LEARNING MODEL

(71) Applicant: Xilinx, Inc., San Jose, CA (US)

(72) Inventors: Shaoxia Fang, Beijing (CN); Jiangsha Ma, Beijing (CN); Xi Wang, Beijing (CN); Junbin Wang, Beijing (CN); Cheng Chen, Beijing (CN); Taobo Wang, Beijing (CN)

(73) Assignee: XILINX, INC., San Jose, CA (US)

( * ) Notice: Subject to any disclaimer, the term of this patent is extended or adjusted under 35 U.S.C. 154(b) by 1014 days.

(21) Appl. No.: 17/227,492

(22) Filed: Apr. 12, 2021

(51) Int. Cl.
  *G06N 3/086* (2023.01)
  *G06N 3/126* (2023.01)
  *G06N 20/00* (2019.01)

(52) U.S. Cl.
  CPC ............. *G06N 3/086* (2013.01); *G06N 3/126* (2013.01); *G06N 20/00* (2019.01)

(58) Field of Classification Search
  CPC ......... G06N 3/086; G06N 3/126; G06N 20/00
  See application file for complete search history.

(56) References Cited

U.S. PATENT DOCUMENTS

2024/0007414 A1* 1/2024 Jain ..................... H04L 41/0823

OTHER PUBLICATIONS

Yuan et al., "Evoq: Mixed precision quantization of dnns via sensitivity guided evolutionary search." In 2020 International Joint Conference on Neural Networks (IJCNN), pp. 1-8. IEEE (Year: 2020).*
Sambhav R. Jain et al., "Trained Quantization Thresholds For Accurate and Efficient Fixed-Point Inference of Deep Neural Networks", arXiv: 1903.08066v3 [cs.CV] Feb. 28, 2020, Proceedings of the 3 rd MLSys Conference, Austin, TX, USA, 2020. Copyright 2020.
Hao Wu, "Low Precision Inference on GPU", Nvidia, printed Aug. 24, 2020.
Szymon Migacz, "8-bit Inference with TensorRT", Nvidia, May 8, 2017.
"Quantization—Neural Network Distiller", printed Apr. 9, 2021.
"Post-training Quantization", TensorFlow Lite, file:///J:/CLIENTS/XLNX—Xilinx/1101PA (X-6349 LC)/IDS/Post-training quantization TensorFlow Lite.html, updated Aug. 21, 2020.

* cited by examiner

*Primary Examiner* — K C Chen
(74) *Attorney, Agent, or Firm* — Patterson + Sheridan, LLP (57) ABSTRACT

Approaches for determining quantization scale factors include generating a population of chromosomes. Each chromosome has multiple genes, and each gene specifies a scale factor associated with a layer of a machine learning model. The population of chromosomes are evaluated, and the evaluating includes, for each chromosome in the population, quantizing floating point weights and floating point values of a representative dataset using the scale factors of the chromosome to produce quantized weights and a quantized dataset in the memory arrangement, initiating processing of the quantized dataset using the quantized weights according to the machine learning model, and gauging a level of accuracy of results produced by the processing of the quantized dataset. Satisfaction of termination criteria is determined based the levels of accuracy associated with the chromosomes in the population. The population of chromosomes is evolved and the evaluating repeated in response to the termination criteria not being satisfied.

20 Claims, 9 Drawing Sheets

DETERMINING QUANTIZATION SCALE FACTORS FOR LAYERS OF A MACHINE LEARNING MODEL

TECHNICAL FIELD

The disclosure generally relates to calibration of scale factors used for quantization in neural networks.

BACKGROUND

Machine learning (ML) is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tanh) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Field programmable gate arrays (FPGAs) have been used to implement circuits that accelerate functions called from software. Circuits that accelerate functions called from software are referred to as hardware accelerators. Examples of hardware accelerators include various image filters implemented as FPGA circuits that can be called from image processing software.

Input datasets and weights are often quantized in order to reduce hardware requirements and improve runtime performance of machine learning models. Floating point values can be quantized to integer values as a function of a scale factor. However, the chosen scale factor can significantly affect accuracy of the results achieved by the ML model. An ML model that produces inaccurate results wastes hardware resources and can lead to deployment of additional resources to ameliorate inaccuracies for critical applications.

SUMMARY

A disclosed method includes generating a population of chromosomes in a memory arrangement by a calibrator circuit. Each chromosome has a plurality of genes, and each gene specifies a scale factor associated with a layer of a machine learning model. The method includes the calibrator circuit evaluating the population of chromosomes. The evaluating includes, for each chromosome in the population, quantizing floating point weights and floating point values of a representative dataset using the scale factors of the chromosome to produce quantized weights and a quantized dataset in the memory arrangement, initiating processing of the quantized dataset using the quantized weights by an accelerator circuit configured to perform operations of the machine learning model, and gauging a level of accuracy of results produced by the processing of the quantized dataset and associating the level of accuracy with the chromosome. The method additionally includes the calibrator circuit determining whether or not termination criteria are satisfied based the levels of accuracy associated with the chromosomes in the population and evolving the population of chromosomes and then repeating the evaluating of the population in response to the termination criteria not being satisfied. The method includes configuring the accelerator circuit to process data quantized according to the scale factors of a chromosome of the population having a greatest associated level accuracy in response to satisfaction of the termination criteria.

A disclosed includes a memory arrangement, an accelerator circuit, and a calibrator circuit. The accelerator circuit is coupled to the memory arrangement and configured to perform operations of a machine learning model. The calibrator circuit is coupled to the memory arrangement and is configured to generate a population of chromosomes and store the chromosomes in the memory arrangement. Each chromosome has a plurality of genes, and each gene specifies a scale factor associated with a layer of the machine learning model. The calibrator circuit is configured to evaluate the population of chromosomes circuit, by performing for each chromosome in the population operations including: quantizing floating point weights and floating point values of a representative dataset using the scale factors of the chromosome to produce quantized weights and a quantized dataset in the memory arrangement, initiating processing the quantized dataset using the quantized weights by the accelerator circuit, and gauging a level of accuracy of results produced by the processing of the quantized dataset and associating the level of accuracy with the chromosome. The calibrator circuit is additionally configured to determine whether or not termination criteria are satisfied based the levels of accuracy associated with the chromosomes in the population and evolve the population of chromosomes and then repeating the evaluating of the population in response to the termination criteria not being satisfied. The calibrator circuit is configured to configure the accelerator circuit to process data quantized according to the scale factors of a chromosome of the population having a greatest associated level accuracy in response to satisfaction of the termination criteria.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

ML models are sometimes calibrated after training in an effort to improve accuracy. One component of calibration involves the selection of scale factors used to quantize tensor inputs and weights. In one approach, the trained ML model is calibrated offline, and the final scale factors are used to generate constant quantized weights and configure scale factors for use on input datasets.

Offline calibration of scale factors can have disadvantages. The accuracy of the machine learning model achieved by offline calibration may be greater than the accuracy observed when the machine learning model is deployed on a hardware accelerator at application runtime if the precision used by the calibration hardware does not match the precision used by the hardware accelerator. For example, the offline calibration might be performed by a graphics processing unit (GPU), while the hardware accelerator used to deploy the model might be an FPGA. Also, a mismatch in precision between hardware can lead to extensive processing time during calibration. Accuracy may also be compromised by approaches that minimize entropy and focus on the levels of accuracy of individual layers.

According to the disclosed methods and systems, a genetic algorithm is employed to calibrate scale factors used in quantizing weights and datasets processed by a machine learning model. An initial population of sets of scale factors is generated for layers of the machine learning model. The initial population comprises a set of chromosomes. Each gene of a chromosome is associated with a layer of the ML model and specifies a scale factor to be used in quantizing floating point values processed in the layer. A layer can have multiple associated scale factors, such as to quantize weights of different channels and tensor data.

Each chromosome of the population is evaluated for suitability for quantization in the layers of the ML model. In evaluating each chromosome, the ML model uses weights that are quantized according to the scale factors of the chromosome to process a dataset quantized according to the scale factors of the chromosome. The level of accuracy provided by the ML model can be gauged by comparing the results computed using the quantized dataset and quantized weights to results previously computed on the same non-quantized dataset using non-quantized weights. The magnitude of the difference between the results can indicate the relative level of accuracy.

If any of the chromosomes in the population provides a desired level of accuracy, the scale factors of that chromosome can be selected for use in quantizing weights and datasets processed by the ML model. If none of the chromosomes in the population provides a desired level of accuracy, the population of chromosomes can be evolved to produce a new population of chromosomes for evaluation. The evaluation and evolution of the population can be repeated until a chromosome provides a desired level accuracy.

Figure 1:
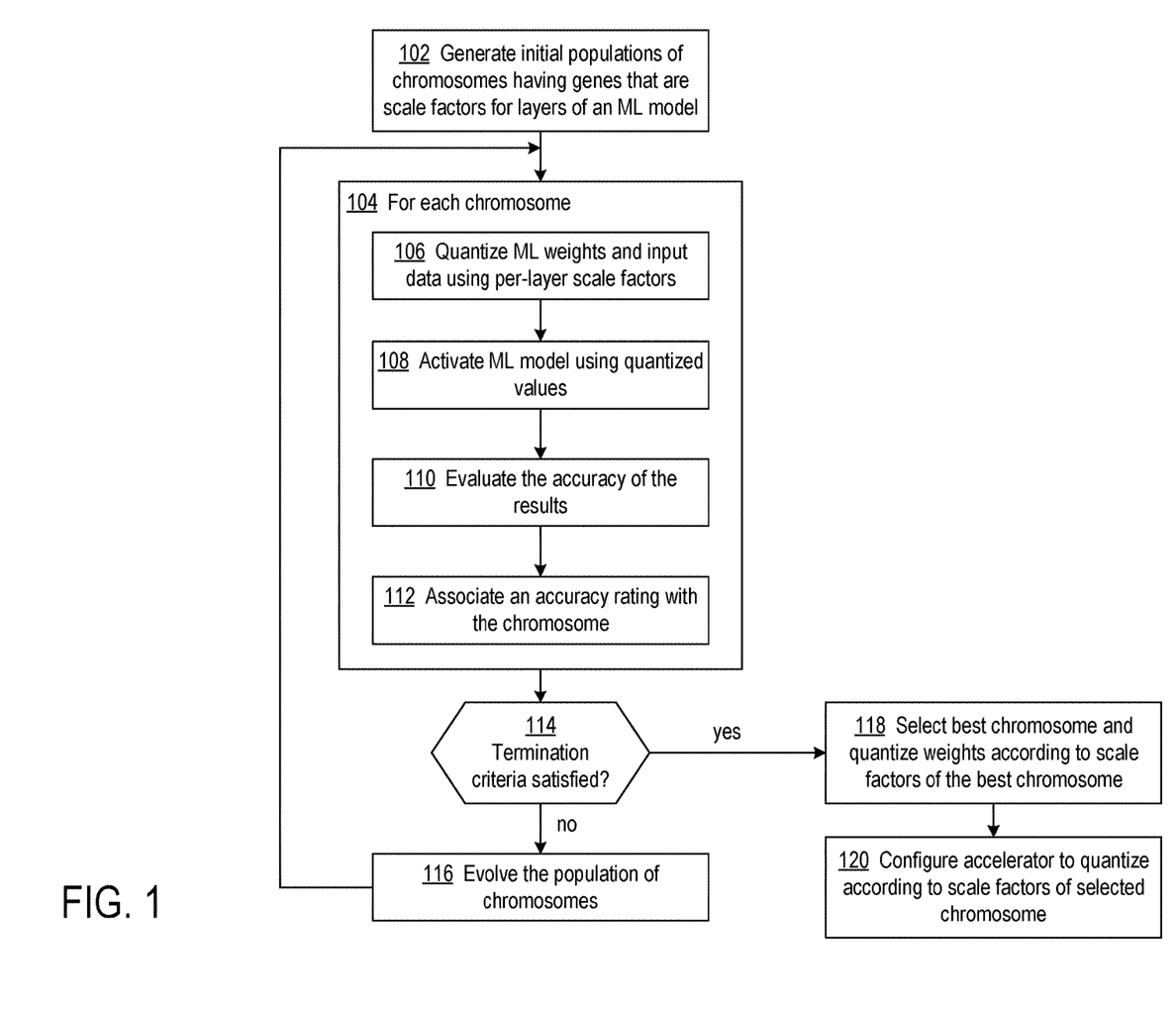
FIG. 1 is a flowchart of an exemplary process for calibrating scale factors for use in quantization of data processed by an ML model.

FIG. 1 is a flowchart of an exemplary process for calibrating scale factors for use in quantization of data processed by an ML model. The relationship between a floating point value, $A_f$, and the quantized value, $A_q$, of $A_f$ can be generally described as $A_f = S * A_q + B$, where $S$ is the scale factor, and $B$ is a bias value. Ignoring the bias value for ease of exposition, the quantized value of $A_f$ can be expressed as $A_q = \text{round}(A_f/S)$. Each channel of a tensor in each layer of the ML model can have an associated scale factor. The process of FIG. 1 produces a set of scale factors for the layers of an ML model using a genetic algorithm.

At block 102, a calibrator circuit, such as a programmed computer system or a programmable IC, generates an initial population of chromosomes. Each chromosome has a plurality of genes, and each gene specifies a scale factor associated with a layer of a machine learning model. Different layers can have different numbers of associated scale factors, and the number of scale factors associated with a layer can be based on the number of filters involved in the layer. For example, each filter can have an associated scale factor used to quantize the weights of the filter.

The population of chromosomes can be limited to a fixed number. The initial scale factors of each chromosome can be based on the maximum absolute value of the floating point values, if the bias is zero (i.e. symmetric quantization), which is the most common case. For example, if the range of floating point values is [−99, +9], and range of quantized values is [−128, +127], the base value is 128/99. The initial scale factor in the chromosomes can be set to 99/128+jitter, where the jitter can be random value within a programmable range.

At block 104, the calibrator circuit activates the ML model to evaluate the suitability of each chromosome in the population. The processing of blocks 106, 108, 110, and 112 is performed for each chromosome in the population. At block 106, the calibrator circuit quantizes floating point weights and floating point values of a representative dataset using the scale factors of the chromosome. The representative dataset can be a dataset used for training or validation of the ML model, for example, and the weights of each filter of each layer can be quantized using an associated scale factor from the chromosome.

At block 108, the calibrator circuit activates the ML model to process the quantized dataset using the quantized weights. The calibrator circuit gauges the level of accuracy of results produced by the ML model from processing the quantized dataset and quantized weights. The level of accuracy achieved by the ML model can be determined by comparing the results (e.g., a level of probability) achieved using the scale factors of the chromosome, to results previously achieved during training or validation using floating point data. The magnitude of the difference between the two results can indicate the level of accuracy and can be associated with the chromosome as an accuracy rating at block 112 for comparison with the results achieved by other chromosomes. Larger differences indicate lesser levels of accuracy than smaller differences.

At decision block 114, the calibrator circuit determines whether or not termination criteria are satisfied. For example, the termination criteria can be based on whether or not any chromosome in the population produced results that are more accurate than a threshold level of accuracy. Termination criteria can also be based on a maximum runtime. If no chromosome has produced results that are more accurate than the threshold and the calibrator circuit has evaluated a maximum number of populations of chromosomes or operated for a maximum period of time, the calibrator circuit can terminate further evolving and evaluating chromosomes.

In response to the termination criteria not being satisfied, at block 116 the calibrator circuit evolves the population of chromosomes and repeats the process of block 104 to evaluate the new population. The evolution of the population can be by crossover, mutation, generating entirely new chromosomes, or any combination thereof, as explained further below.

In response to the termination criteria being satisfied, at block 118 the calibrator circuit selects the chromosome that produced results having the greatest level of accuracy. The calibrator circuit can configure a machine learning accelerator (or "accelerator circuit") that performs operations of the machine learning model to process data quantized according to the scale factors of the selected chromosome by quantizing the weights of the filters at block 118, and at block 120 configuring the circuitry of an accelerator to quantize datasets with the scale factors.

Figure 2:
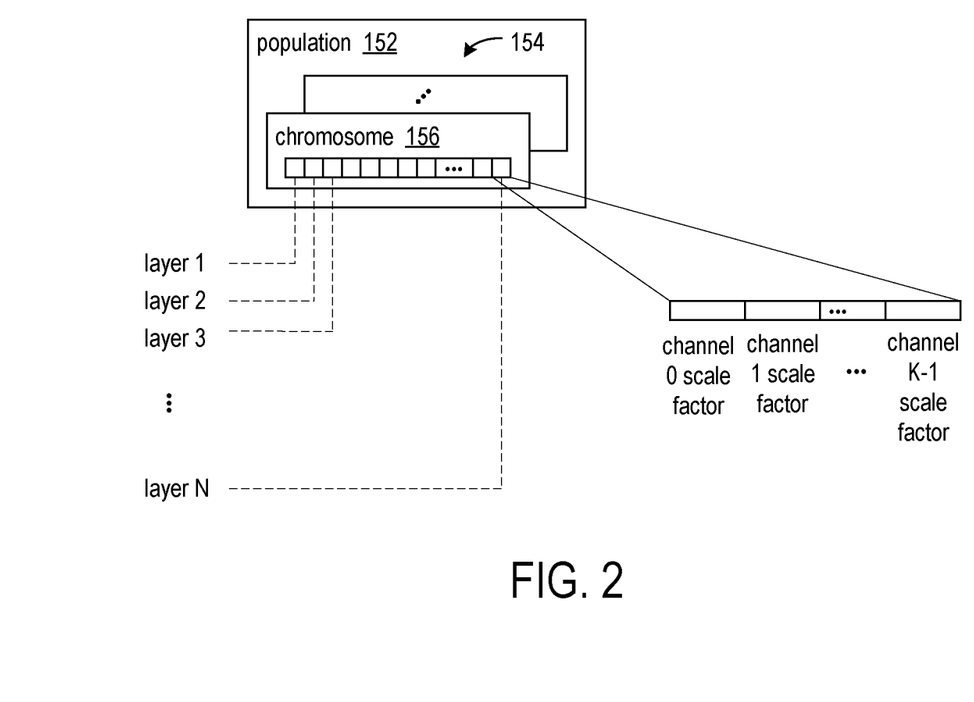
FIG. 2 illustrates a population of chromosomes.

FIG. 2 illustrates a population 152 of chromosomes 154. The chromosome 156 is shown as having multiple blocks, and each block corresponds to a layer of an ML model. Chromosome 156 is shown has having blocks associated with N layers of an ML model.

Each layer of the ML model can use multiple filters, and each filter can have a dedicated scale factor. For example, for a layer N having K channels, the scale factors associated with layer N are shown as scale factor 0, scale factor 1, . . . scale factor K−1. Each chromosome can be viewed as having genes that specify the scale factors associated with the various layers of the ML model.

Figure 3:
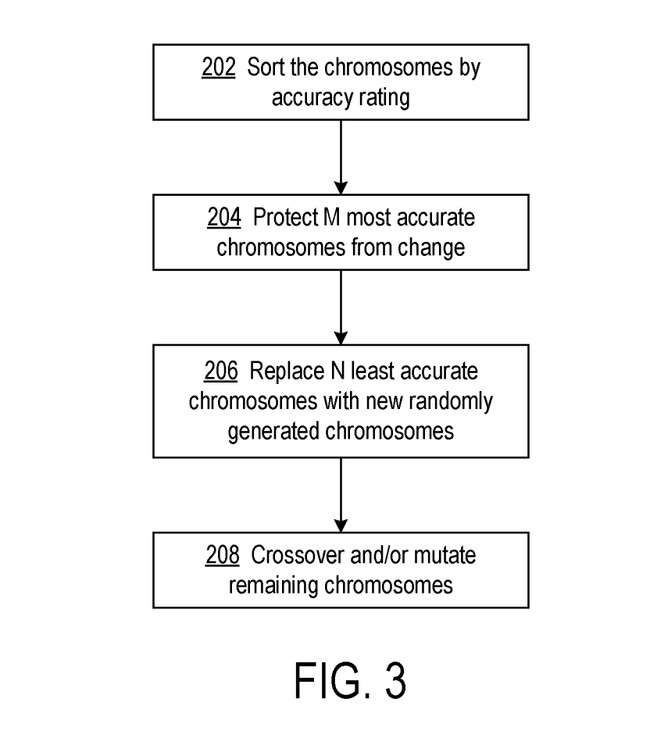
FIG. 3 shows a flowchart of an exemplary process of evolving the population of chromosomes having genes that specify scale factors.

FIG. 3 shows a flowchart of an exemplary process of evolving the population of chromosomes having genes that specify scale factors. At block 202, the calibration circuit sorts the chromosomes of the population in order from the chromosome having a rating indicating the greatest level of accuracy to the chromosome having a rating indicating the least level of accuracy.

At block 204, the calibrator circuit protects a subset of the chromosomes from being changed. The subset can include a fixed number, M, of chromosomes having the best accuracy rating (most accurate) in each iteration. The chromosomes of the population that are not protected are eligible for evolution.

At block 206, the calibrator circuit discards a subset of the chromosomes in the population and replaces the subset with randomly generated chromosomes, as described above. The subset can include a fixed number, N, of chromosomes having the worst accuracy ratings (least accurate) in each iteration. The new chromosomes can be protected from crossover and mutation.

At block 208, the calibrator circuit performs crossover and/or mutation on the chromosomes of the population that were neither protected nor newly generated. In an exemplary approach, crossover and mutation are performed independently. That is, a subset of the eligible chromosomes are selected at random for crossover, and another subset of the eligible chromosomes are selected for mutation. Alternatively, separate, exclusive subsets can be selected for crossover and mutation. Crossover can be performed first, followed by mutation. Alternatively, mutation can be performed first followed by crossover. Crossover and mutation operations are exemplified in FIGS. 5 and 6 and described further below.

Figure 4:
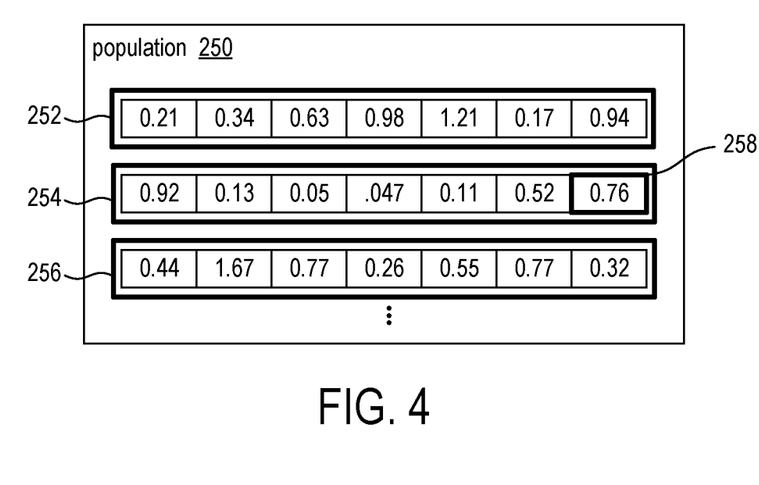
FIG. 4 illustrates a population in which three exemplary chromosomes of the population are shown.

FIG. 4 illustrates an exemplary population 250 in which three chromosomes of the population are shown. The three chromosomes are referenced by 252, 254, and 256. Each chromosome has 7 genes, and each gene specifies a scale factor. For example, gene 258 of chromosome 254 specifies a scale factor of 0.76.

Figure 5:
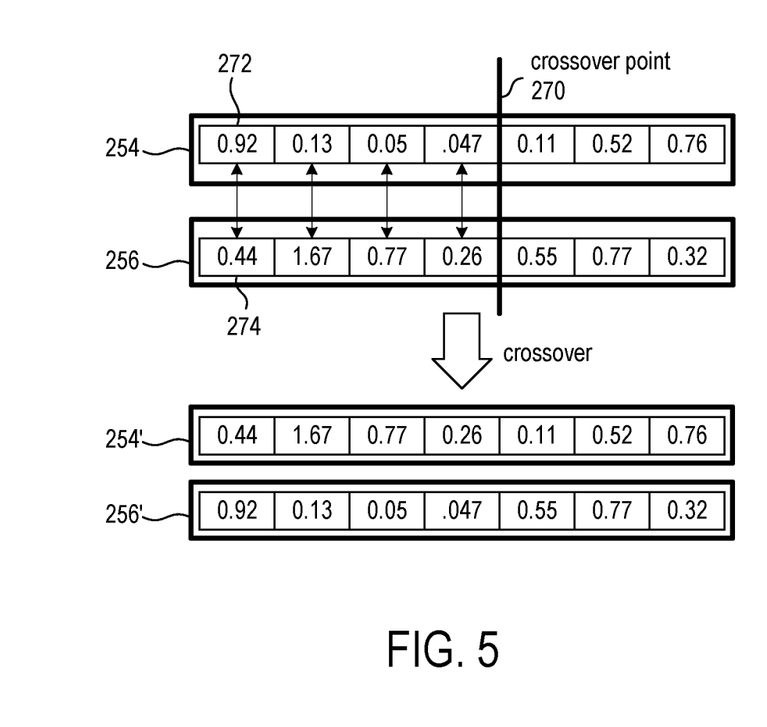
FIG. 5 illustrates a crossover operation on two chromosomes.
Figure 6:
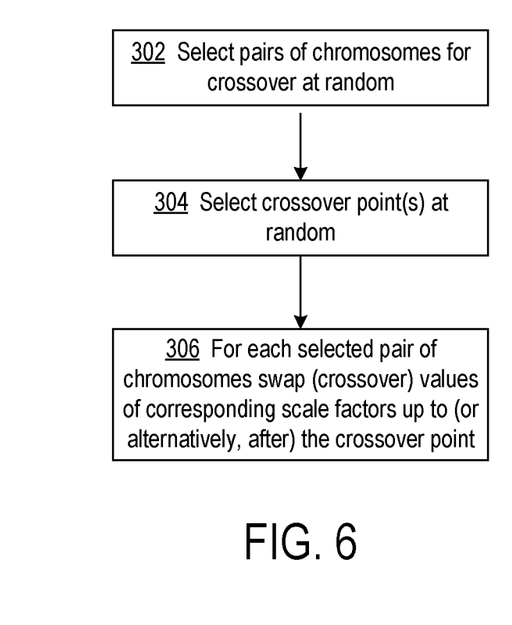
FIG. 6 illustrates a flowchart of an exemplary crossover process.

FIG. 5 illustrates a crossover operation on chromosomes 254 and 256 of FIG. 4. FIG. 6 illustrates a flowchart of an exemplary crossover process. According to one approach, pairs of eligible chromosomes are selected at random for crossover at block 302. In selecting each pair, one chromosome of the pair can be selected at random, and then the other chromosome of the pair can be selected at random. The number of pairs can be a fixed number in evolving each generation or a random number. According to an alternative approach, the pairs of chromosomes can be selected based on accuracy ratings and sorted order. For example, a chromosome can be paired with the chromosomes having the next most accuracy rating.

Within each selected pair of chromosomes, a subset of the genes can be selected for crossover. In one approach, a crossover point, for example, crossover point 270 in FIG. 5, can be selected at random at block 304. Genes occupying positions in the chromosome to the left of the crossover point are subject to crossover, and genes occupying positions to the right of the crossover point are not subject to crossover. In another approach, the genes selected for crossover can be individually selected at random.

Crossover of each selected pair of chromosomes involves interchanging the scale factors specified by the pairs of corresponding genes at block 306. For example, in FIG. 5 the scale factors 0.02 and 0.44 of corresponding genes 272 and 274 are interchanged. The result of the crossover is shown as chromosomes 254' and 256'.

A variation of crossover can involve more than two chromosomes. For example, the scale factors in corresponding genes of three or more chromosomes can be rotated through the chromosomes or reassigned at random to different ones of the group.

Figure 7:
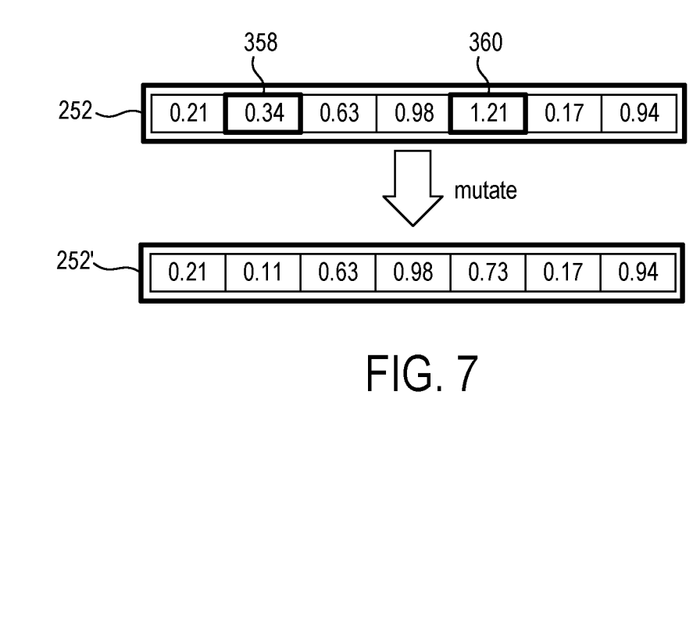
FIG. 7 illustrates a mutation operation on a chromosome.
Figure 8:
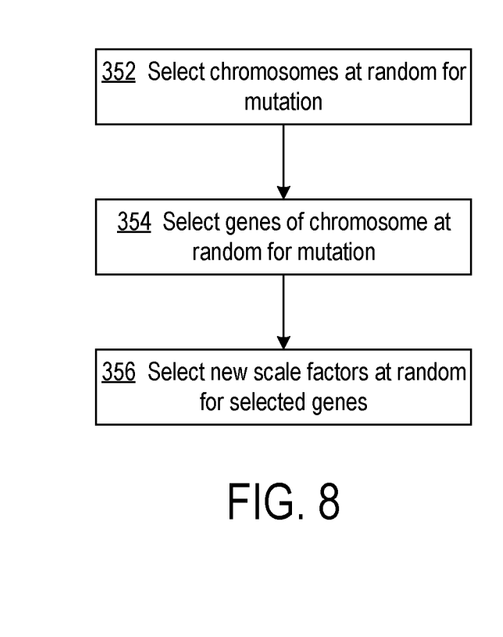
FIG. 8 illustrates a flowchart of an exemplary mutation process.

FIG. 7 illustrates a mutation operation on chromosome 252 of FIG. 4. FIG. 8 illustrates a flowchart of an exemplary mutation process. According to one approach, a number of eligible chromosomes are selected at random for mutation at block 352. The number of chromosomes can be a fixed number in evolving each generation or a random number.

Within each selected chromosome, a subset of the genes can be selected for mutation. In one approach, the genes selected for mutation can be individually selected at random at block 354. According to one approach, a probability of mutating is associated with each gene to determine whether or not the gene will be mutated.

Mutation of each selected gene involves generating a new scale factor at random at block 356. For example, in FIG. 7 the scale factors 0.34 and 1.21 of genes 358 and 360 are mutated to scale factors 0.11 and 0.73 as shown as chromosome 252'.

Figure 9:
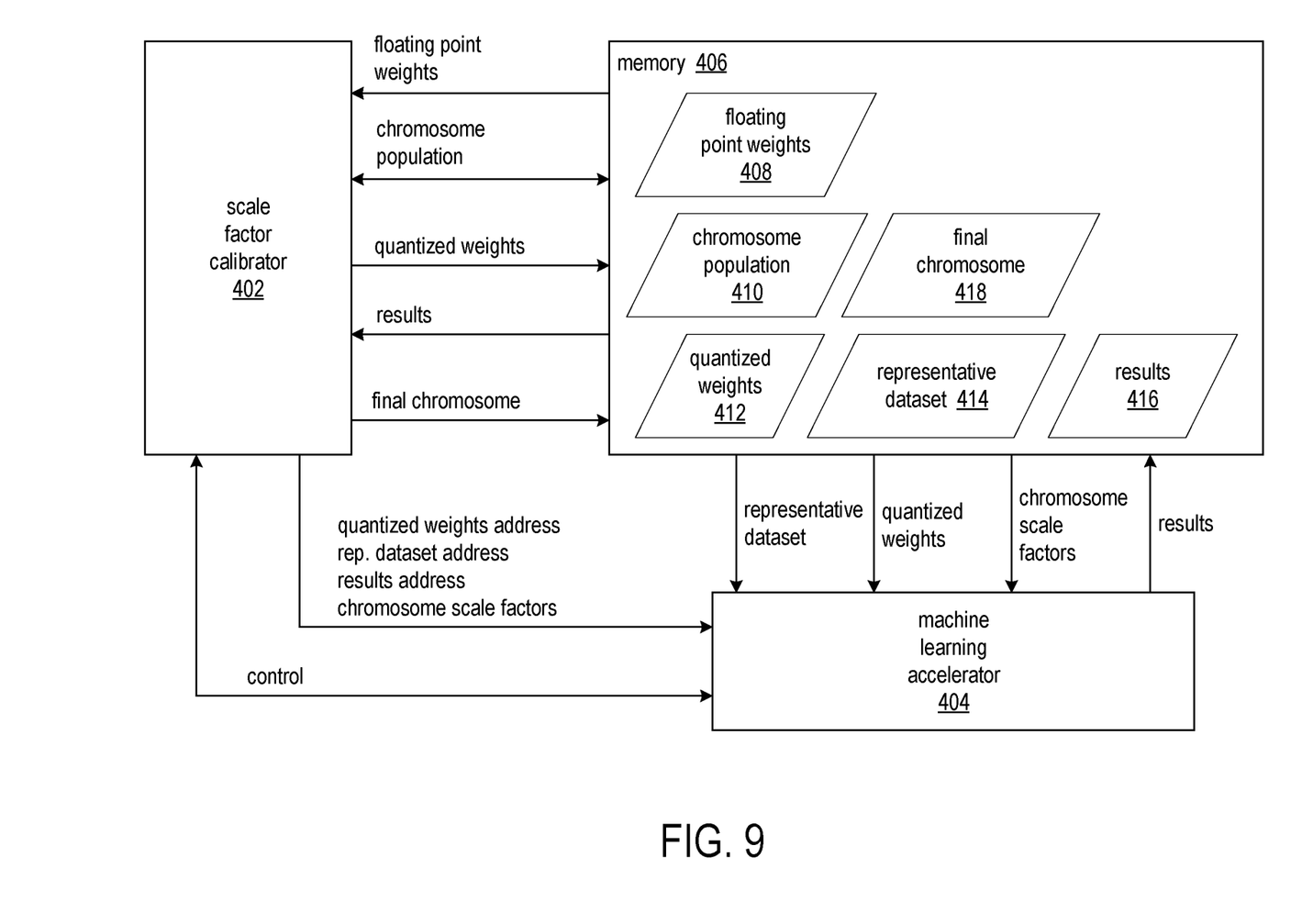
FIG. 9 shows an exemplary system for calibrating scale factors used in implementing a machine learning model.

FIG. 9 shows an exemplary system for calibrating scale factors used in implementing a machine learning model. The system includes a calibrator circuit 402, an ML accelerator 404, and a memory 406. The calibrator circuit can be a host computer system, or a system-on-chip (SoC) having an instruction processing unit and programmable logic, for example. The ML accelerator 404 can be programmable logic configured to perform tensor computations (e.g., multiply and accumulate) of a ML model. The memory 406 can be shared by the calibrator circuit and the ML accelerator through data, address, and control buses (not shown).

The calibrator circuit 402 inputs floating point weights 408, which are the weights used to training the ML model. The calibrator circuit determines a lower bound and an upper bound of quantized values of the weights, and generates a population 410 of chromosomes having scale factors constrained to produce the lower and upper bounds of the quantized weights.

The calibrator circuit 402 evaluates each chromosome in the population as described above. The calibrator circuit generates quantized weights 412 and communicates the address of the quantized weights and representative dataset 414 to the ML accelerator. The calibrator circuit can also communicate an address at which results 416 are to be stored and an address of the chromosome scale factors to be used by the ML accelerator.

In response to control signals from the calibrator circuit 402, the ML accelerator inputs the representative dataset 414, the quantized weights 412, and chromosome scale factors. The ML accelerator can quantize the representative dataset using the input scale factors and perform ML tensor computations under the control of the calibrator circuit 402. The ML accelerator stores the results 416 in the memory 406 and signals the calibrator circuit when the results are available.

The calibrator circuit 402 determines the accuracy of the results 416 produced by each chromosome. The calibrator circuit evolves the chromosome population if none of the chromosomes in the population produced acceptably accurate results. If the results are acceptable, the calibrator circuit saves the evaluated chromosome as final chromosome 418.

If a chromosome of the population produced acceptable results, or if the calibrator circuit has evolved the chromosome population into a threshold number of generations and no chromosome has produced acceptable results, the calibrator circuit can select the final chromosome to be the chromosome having the highest accuracy rating in the current generation.

Once a final chromosome 418 has been generated, the calibrator circuit 402 can configure the memory 406 and ML accelerator 404 to process application datasets (not shown). For example, the calibrator circuit can quantize the floating point weights 408 into final quantized weights (not shown) using the scale factors of the final chromosome. The calibrator can store the final quantized weights in the memory for access by the ML accelerator in the processing the application datasets. The ML accelerator can quantize the application datasets using the scale factors of the final chromosome.

Figure 10:
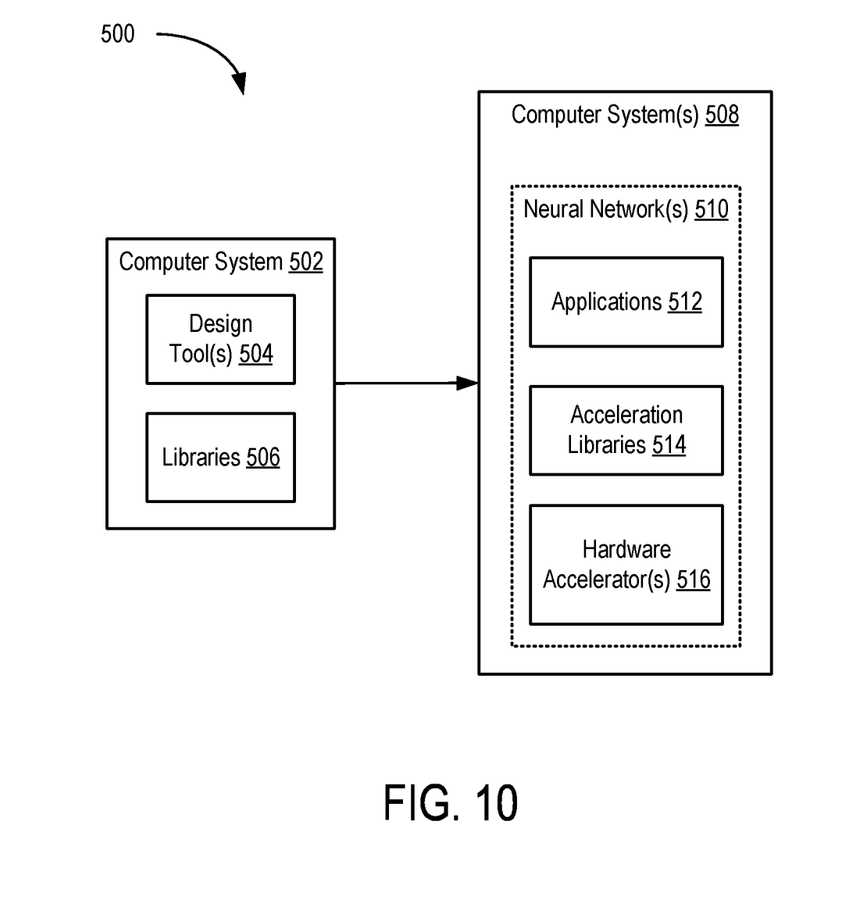
FIG. 10 is a block diagram depicting a system for implementing ML models including neural networks according to an example.

FIG. 10 is a block diagram depicting a system 500 for implementing ML models including neural networks according to an example. The system 500 includes a computer system 502 and one or more computer systems 508. The computer system 502 includes conventional computing components configured to execute software that provides one or more design tools 504. Each computer system 508 implements one or more neural networks 510. The neural network(s) 510 are implemented using applications 512, acceleration libraries 514, and one or more hardware accelerators 516.

In an example, the hardware accelerator(s) 516 include programmable integrated circuits (ICs), such as field programmable gate arrays (FPGAs). The acceleration libraries 514 provide application programming interfaces (APIs) to interface with the hardware accelerator(s) 516. The acceleration libraries 514 can also include libraries that provide neural network functions, including predefined and optimized implementations of neural network layers and other types of neural network structures. Thus, the neural network(s) 510 can include both hardware portions implemented in the hardware accelerator(s) 516, as well as software portions implemented in the acceleration libraries 514. The applications 512 invoke the APIs of the acceleration libraries 514 to program and control the hardware accelerator(s) 516 to implement the neural network(s) 516.

A designer interacts with the design tool(s) 504 to define the neural network(s) 510. The design tool(s) 504 can generate files for programming the hardware accelerator(s) 516 (e.g., configuration bitstreams for FPGAs), files that provide the acceleration libraries 514, and files that provide the applications 512. The designer can define the hardware portions of the neural network(s) 510 using a register transfer language (RTL) or using a programming language, such as C, C++, OpenCL, and the like, or a combination of RTL and programmable language(s). The user can define the software portions of the neural network(s) 510 using a programming language, such as C, C++, OpenCL, etc. The design tool(s) 504 compile the software-defined neural networks to generate files for programming the hardware accelerator(s) 516 and library files for the acceleration libraries 514. The designer can make use of libraries 506 that provide class libraries, template libraries, and the like to assist in developing the hardware and software portions of the neural network(s) 510.

A user can define the applications 512 using a programming language (e.g., C, C++, Python, etc.). The user can make use of neural network frameworks and libraries, such as Caffe, TensorFlow™, MXNet, and the like.

Figure 11:
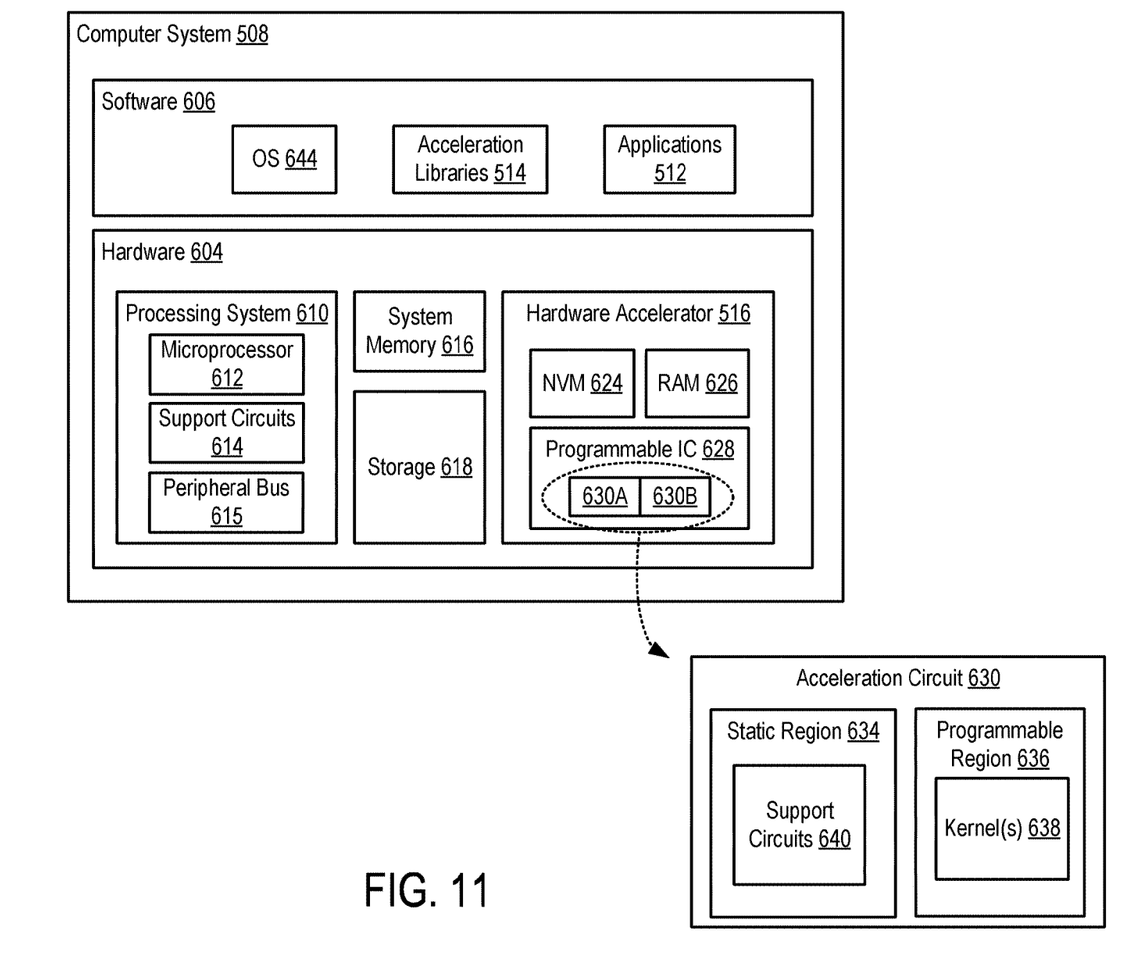
FIG. 11 is a block diagram depicting a computing system according to an example.

FIG. 11 is a block diagram depicting a computing system 508 according to an example. The computing system 508 includes hardware 604 and software 606 executing on the hardware 604. The hardware 604 includes a processing system 610, system memory 616, storage device(s) ("storage 618"), and a hardware accelerator 516 (or "ML accelerator"). The software 606 includes an operating system (OS) 644, the acceleration libraries 514, and the applications 512. The processing system 610, system memory 616, and storage 618 comprise a host computer system as referenced herein.

The processing system 610 includes a microprocessor 612, support circuits 614, and a peripheral bus 615. The microprocessor 612 can be any type of general-purpose central processing unit (CPU), such as an x86-based processor, ARM®-based processor, or the like. The microprocessor 612 can include one or more cores and associated circuitry (e.g., cache memories, memory management units (MMUs), interrupt controllers, etc.). The microprocessor 612 is configured to execute program code that perform one or more operations described herein and which can be stored in the system memory 616 and/or the storage 618. The support circuits 614 include various devices that cooperate with the microprocessor 612 to manage data flow between the microprocessor 612, the system memory 616, the storage 618, the hardware accelerator 516, or any other peripheral device. For example, the support circuits 614 can include a chipset (e.g., a north bridge, south bridge, platform host controller, etc.), voltage regulators, firmware (e.g., a BIOS), and the like. The support circuits 614 manage data flow between the microprocessor 612 and the peripheral bus 615, to which various peripherals, such as the hardware accelerator 516, are connected. In some examples, the microprocessor 612 can be a System-in-Package (SiP), System-on-Chip (SoC), or the like, which absorbs all or a substantial portion of the functionality of the chipset (e.g., north bridge, south bridge, etc.). The peripheral bus 615 can implement an expansion bus standard, such as Peripheral Component Interconnect Express (PCIe). In the example, the processing system 610 is shown separate from the hardware accelerator 516. In other examples discussed further below, the processing system 610 and the hardware accelerator 516 can be implemented on the same integrated circuit (IC) using a System-On-Chip (SoC).

The system memory 616 is a device allowing information, such as executable instructions and data, to be stored and retrieved. The system memory 616 can include, for example, one or more random access memory (RAM) modules, such as double-data rate (DDR) dynamic RAM (DRAM). The storage device 618 includes local storage devices (e.g., one or more hard disks, flash memory modules, solid state disks, and optical disks) and/or a storage interface that enables the computing system 508 to communicate with one or more network data storage systems. The hardware 604 can include various other conventional devices and peripherals of a computing system, such as graphics cards, universal serial bus (USB) interfaces, and the like.

The hardware accelerator 516 includes a programmable IC 628, a non-volatile memory (NVM) 624, and RAM 626. The programmable IC 628 can be an FPGA or the like or an SoC having an FPGA or the like. The NVM 624 can include any type of non-volatile memory, such as flash memory or the like. The RAM 626 can include DDR DRAM or the like. The programmable IC 628 is coupled to the NVM 624 and the RAM 626. The programmable IC 628 is also coupled to the peripheral bus 615 of the processing system 610.

The OS 644 can be any commodity operating system known in the art, such as Linux®, Microsoft Windows®, Mac OS®, or the like. The acceleration libraries 514 includes drivers and libraries that provide APIs for command and control of the hardware accelerator 516. The applications 512 include software executing on the microprocessor 612 that invokes the APIs of the acceleration libraries 514 to implement neural network(s).

In operation, the programmable IC 628 is configured with an acceleration circuit 630. The acceleration circuit 630 generally includes a base platform 630A and a neural network accelerator 630B. For example, the acceleration circuit 630 can be implemented using a static region 634 and a programmable region 636. The static region 634 includes support circuits 640 for providing an interface to the peripheral bus 615, the NVM 624, and the RAM 626. The programmable region 636 can include one or more neural network accelerators ("kernel(s) 638"). The base platform 630A is implemented using the static region 634, and the neural network accelerator 630B is implemented using the programmable region 636. In another example, the base platform 630A can also be implemented using a portion of the programmable region 636. Thus, in some examples, the programmable region 636 also includes some interface circuits. In some examples, the acceleration circuit 630 can include more than one programmable region 636, each of which can be individually configured with neural network accelerator(s) 638.

Figure 12:
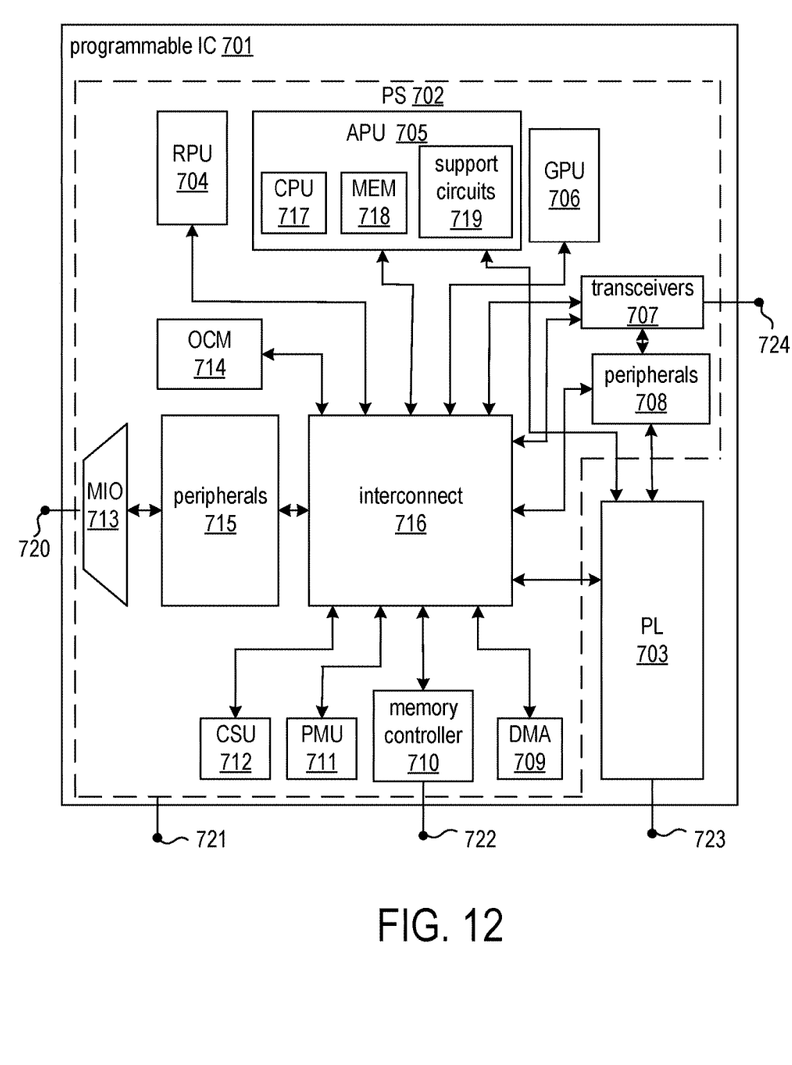
FIG. 12 is a block diagram depicting an exemplary System-on-Chip (SoC) that can host the calibrator circuit and ML accelerator.

FIG. 12 is a block diagram depicting an exemplary System-on-Chip (SoC) 701 that can host the calibrator circuit and ML accelerator. In the example, the SoC includes the processing subsystem (PS) 702 and the programmable logic subsystem 703. The processing subsystem 702 includes various processing units, such as a real-time processing unit (RPU) 704, an application processing unit (APU) 705, a graphics processing unit (GPU) 706, a configuration and security unit (CSU) 712, and a platform management unit (PMU) 711. The PS 702 also includes various support circuits, such as on-chip memory (OCM) 714, transceivers 707, peripherals 708, interconnect 716, DMA circuit 709, memory controller 710, peripherals 715, and multiplexed (MIO) circuit 713. The processing units and the support circuits are interconnected by the interconnect 716. The PL subsystem 703 is also coupled to the interconnect 716. The transceivers 707 are coupled to external pins 724. The PL 703 is coupled to external pins 723. The memory controller 710 is coupled to external pins 722. The MIO 713 is coupled to external pins 720. The PS 702 is generally coupled to external pins 721. The APU 705 can include a CPU 717, memory 718, and support circuits 719. The APU 705 can include other circuitry, including L1 and L2 caches and the like. The RPU 704 can include additional circuitry, such as L1 caches and the like. The interconnect 716 can include cache-coherent interconnect or the like.

Referring to the PS 702, each of the processing units includes one or more central processing units (CPUs) and associated circuits, such as memories, interrupt controllers, direct memory access (DMA) controllers, memory management units (MMUs), floating point units (FPUs), and the like. The interconnect 716 includes various switches, busses, communication links, and the like configured to interconnect the processing units, as well as interconnect the other components in the PS 702 to the processing units.

The OCM 714 includes one or more RAM modules, which can be distributed throughout the PS 702. For example, the OCM 714 can include battery backed RAM (BBRAM), tightly coupled memory (TCM), and the like. The memory controller 710 can include a DRAM interface for accessing external DRAM. The peripherals 708, 715 can include one or more components that provide an interface to the PS 702. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 715 can be coupled to the MIO 713. The peripherals 708 can be coupled to the transceivers 707. The transceivers 707 can include serializer/deserializer (SERDES) circuits, MGTs, and the like.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for calibrating scale factors. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
generating a population of chromosomes in a memory arrangement by a calibrator circuit, each chromosome having a plurality of genes, wherein each gene specifies a scale factor associated with a layer of a machine learning model;
evaluating the population of chromosomes by the calibrator circuit, the evaluating including for each chromosome in the population:
quantizing floating point weights and floating point values of a representative dataset using the scale factors of the plurality of genes of each chromosome to produce quantized weights and a quantized representative dataset in the memory arrangement,
initiating processing of the quantized representative dataset using the quantized weights by an accelerator circuit configured to perform operations of the machine learning model, and
gauging a level of accuracy of results produced by the processing of the quantized representative dataset and associating the level of accuracy with each chromosome; and
deploying the accelerator circuit with the machine learning model at an application runtime to process application data quantized according to the scale factors of a selected chromosome of the population having a greatest associated level of accuracy in response to satisfaction of a termination criteria.

2. The method of claim 1, further comprising:
in response to the termination criteria not being satisfied, evolving the population of chromosomes by the calibrator circuit and repeating the evaluating of the population;
wherein the evolving includes:
selecting a plurality of pairs of chromosomes from the population;
selecting a plurality of pairs of corresponding genes in each of the pairs of chromosomes; and
interchanging the scale factors specified by the pairs of corresponding genes between the chromosomes in each of the pairs of chromosomes.

3. The method of claim 1, further comprising:
in response to the termination criteria not being satisfied, evolving the population of chromosomes by the calibrator circuit and repeating the evaluating of the population;
wherein the evolving includes:
selecting a subset of chromosomes from the population;
selecting a subset of genes in each chromosome of the subset of chromosomes; and
generating at random, new scale factors for the subset of genes.

4. The method of claim 1, further comprising:
in response to the termination criteria not being satisfied, evolving the population of chromosomes by the calibrator circuit and repeating the evaluating of the population;
wherein the evolving includes:
selecting a first subset of chromosomes from the population;
selecting a second subset of chromosomes from the population;
leaving the scale factors specified by the genes of the first subset of chromosomes unchanged for a next iteration of the evaluating; and
evolving the scale factors specified by the genes of the second subset of chromosomes for a next repetition of the evaluating.

5. The method of claim 1, further comprising:
in response to the termination criteria not being satisfied, evolving the population of chromosomes by the calibrator circuit and repeating the evaluating of the population;
wherein the evolving includes:
selecting a subset of chromosomes from the population; and
generating at random, new scale factors for the genes of the subset of chromosomes for a next repetition of the evaluating.

6. The method of claim 1, wherein the processing includes performing tensor computations of the machine learning model involving the quantized representative dataset and the quantized weights on a programmable integrated circuit.

7. The method of claim 1, further comprising:
inputting a plurality of representative datasets to the accelerator circuit for processing; and
quantizing each representative dataset of the plurality of representative datasets into a plurality of quantized representative datasets using the scale factors of the chromosome having the greatest associated level accuracy.

8. The method of claim 7, further comprising:
quantizing the floating point weights into final quantized weights using the scale factors of the chromosome having the greatest associated level accuracy; and
storing the final quantized weights in the memory arrangement for access by the accelerator circuit in processing the application data.

9. The method of claim 1, further comprising:
in response to the termination criteria not being satisfied, evolving the population of chromosomes by the calibrator circuit and repeating the evaluating of the population;
wherein the evolving includes:
selecting a plurality of pairs of chromosomes from the population;
selecting a plurality of pairs of corresponding genes in each of the pairs of chromosomes;

interchanging the scale factors specified by each of the pairs of corresponding genes of the selected plurality of pairs of corresponding genes;

selecting a subset of chromosomes from the population other than the pairs of chromosomes; and generating at random, new scale factors for genes of the subset of chromosomes for a next repetition of the evaluating.

10. The method of claim 1, further comprising:

in response to the termination criteria not being satisfied, evolving the population of chromosomes by the calibrator circuit and repeating the evaluating of the population;

wherein the evolving includes:

selecting a first subset of chromosomes from the population;

selecting a subset of genes in each chromosome of the first subset of chromosomes;

generating at random, new scale factors for the subset of genes;

selecting a second subset of chromosomes from the population; and generating at random, new scale factors for genes of the second subset of chromosomes for a next repetition of the evaluating.

11. A system, comprising:

a memory arrangement; an accelerator circuit coupled to the memory arrangement and configured to perform operations of a machine learning model;

a calibrator circuit coupled to the memory arrangement, wherein the calibrator circuit is configured to:

generate a population of chromosomes and store the chromosomes in the memory arrangement, wherein each chromosome has a plurality of genes, and each gene specifies a scale factor associated with a layer of the machine learning model;

evaluate the population of chromosomes, by performing for each chromosome in the population, operations including:

quantizing floating point weights and floating point values of a representative dataset using the scale factors of the plurality of genes of each chromosome to produce quantized weights and a quantized representative dataset in the memory arrangement, initiating processing the quantized representative dataset using the quantized weights by the accelerator circuit, and gauging a level of accuracy of results produced by the processing of the quantized representative dataset and associating the level of accuracy with each chromosome; and deploying the accelerator circuit with the machine learning model at an application runtime to process application data quantized according to the scale factors of a selected chromosome of the population having a greatest associated level of accuracy in response to satisfaction of a termination criteria.

12. The system of claim 11, wherein in response to the termination criteria not being satisfied the calibrator circuit is configured to evolve the population of chromosomes and repeat the evaluating of the population, and evolving the population includes:

selecting a plurality of pairs of chromosomes from the population;

selecting a plurality of pairs of corresponding genes in each of the pairs of chromosomes; and interchanging the scale factors specified by the pairs of corresponding genes between the chromosomes in each of the pairs of chromosomes.

13. The system of claim 11, wherein in response to the termination criteria not being satisfied the calibrator circuit is configured to evolve the population of chromosomes and repeat the evaluating of the population, and evolving the population includes:

selecting a subset of chromosomes from the population;

selecting a subset of genes in each chromosome of the subset of chromosomes; and generating at random, new scale factors for the subset of genes.

14. The system of claim 11, wherein in response to the termination criteria not being satisfied the calibrator circuit is configured to evolve the population of chromosomes and repeat the evaluating of the population, and evolving the population includes:

selecting a first subset of chromosomes from the population;

selecting a second subset of chromosomes from the population;

leaving the scale factors specified by the genes of the first subset of chromosomes unchanged for a next iteration of the evaluating; and evolving the scale factors specified by the genes of the second subset of chromosomes for a next repetition of the evaluating.

15. The system of claim 11, wherein in response to the termination criteria not being satisfied the calibrator circuit is configured to evolve the population of chromosomes and repeat the evaluating of the population, and evolving the population includes:

selecting a subset of chromosomes from the population; and generating at random, new scale factors for the genes of the subset of chromosomes for a next repetition of the evaluating.

16. The system of claim 11, wherein the processing includes performing tensor computations of the machine learning model involving the quantized representative dataset and the quantized weights on a programmable integrated circuit.

17. The system of claim 11, wherein the accelerator circuit is configured to:

input a plurality of representative datasets for processing; and quantize each representative dataset of the plurality of representative datasets into a plurality of quantized representative datasets using the scale factors of the chromosome having the greatest associated level accuracy.

18. The system of claim 17, wherein the calibrator circuit is configured to:

quantize the floating point weights into final quantized weights using the scale factors of the chromosome having the greatest associated level accuracy; and store the final quantized weights in the memory arrangement for access by the accelerator circuit in processing the application data.

19. The system of claim 11, wherein in response to the termination criteria not being satisfied the calibrator circuit is configured to evolve the population of chromosomes and repeat the evaluating of the population, and evolving the population includes:

selecting a plurality of pairs of chromosomes from the population;

selecting a plurality of pairs of corresponding genes in each of the pairs of chromosomes;

interchanging the scale factors specified by each of the pairs of corresponding genes of the selected plurality of pairs of corresponding genes;

selecting a subset of chromosomes from the population other than the pairs of chromosomes; and generating at random, new scale factors for genes of the subset of chromosomes for a next repetition of the evaluating.

20. The system of claim 11, wherein in response to the termination criteria not being satisfied the calibrator circuit is configured to evolve the population of chromosomes and repeat the evaluating of the population, and evolving the population includes:

selecting a first subset of chromosomes from the population;

selecting a subset of genes in each chromosome of the first subset of chromosomes;

generating at random, new scale factors for the subset of genes;

selecting a second subset of chromosomes from the population; and generating at random, new scale factors for genes of the second subset of chromosomes for a next repetition of the evaluating.

* * * * *